United States Patent

Schäpel et al.

Patent Number: 5,362,834
Date of Patent: Nov. 8, 1994

[54] GEL COMPOUNDS, THEIR PRODUCTION AND USE

[75] Inventors: Dietmar Schäpel, Cologne; Heinz-Dieter Ebert, Leichlingen; Hartwig Grammes, Leverkusen, all of Germany

[73] Assignee: Bayer Aktiengesellschaft, Leverkusen, Germany

[21] Appl. No.: 875,620

[22] Filed: Apr. 28, 1992

[30] Foreign Application Priority Data

May 1, 1991 [DE] Germany ............... 4114213

[51] Int. Cl.$^5$ ............................ C08G 18/18
[52] U.S. Cl. .................... 528/58; 528/76; 528/85
[58] Field of Search ........ 252/182.26; 128/847; 528/58, 76, 85

[56] References Cited

U.S. PATENT DOCUMENTS

| | | | |
|---|---|---|---|
| 4,101,704 | 7/1978 | Hiles | 428/218 |
| 4,346,205 | 8/1982 | Hiles | 528/53 |
| 4,410,667 | 1/1982 | Porter et al. | 525/440 |
| 4,456,642 | 6/1984 | Burgdörfer et al. | 428/68 |
| 4,552,944 | 11/1985 | Kamiyama et al. | 528/55 |
| 4,722,946 | 2/1988 | Hostettler | 521/158 |

FOREIGN PATENT DOCUMENTS

| | | |
|---|---|---|
| 0057838 | 8/1982 | European Pat. Off. |
| 2328727 | 5/1977 | France |
| WO89/07117 | 8/1989 | WIPO |

OTHER PUBLICATIONS

AN:89-343202, "Gel Substance Package...", Derwent Pub.

Primary Examiner—Morton Foelak
Assistant Examiner—R. F. Johnson
Attorney, Agent, or Firm—Sprung Horn Kramer & Woods

[57] ABSTRACT

Improved gel compounds based on reaction products of polyols and polyisocyanates are characterized in that the polyol component consists of a mixture of a) one or more polyols having hydroxyl values below 112 and b) one or more polyols having hydroxyl values of 112 to 600 and in that the isocyanate index of the reaction mixture is in the range from 15 to 70. They may be used as pressure-distributing elements.

11 Claims, No Drawings

GEL COMPOUNDS, THEIR PRODUCTION AND USE

This invention relates to improved gel compounds based on polyols and polyisocyanates, to a process for the production of these gel compounds and to their use in pressure-distributing elements.

Known gel compounds for use in pressure-distributing elements, for example in cushions for wheelchairs, are based above all on polyvinyl chloride, polyorganosiloxanes and polyurethanes, i.e. reaction products of polyols and polyisocyanates. Gel compounds based on polyurethanes of the type described in EP-A 0 057 838 have proved to be particularly advantageous for specific adaptation of their properties to the particular application envisaged.

Polyurethane gels of this type, which may be obtained from polyols of relatively high molecular weight and polyisocyanates, have the disadvantange that the two reaction components have to be mixed with one another in very different quantities. Accordingly, where the gels are produced by machine, the polyisocyanate component which is used in relatively small quantities has to be metered very accurately and with only minimal variations, otherwise gel compounds of variable consistency are obtained. In addition, it is virtually impossible for the components to be homogeneously mixed in such mixing ratios. This applies in particular where the machines used are so-called high-pressure machines where the mixing times are only fractions of a second. Finally, the very different viscosities of the two reaction components also make it difficult to obtain a homogeneous reaction mixture. Inhomogeneous reaction mixtures naturally lead to non-uniform gel compounds.

Another disadvantage of the known polyurethane gel compounds is their limited structural strength under particular stressing, for example in the form of the flexural and shear stressing applied to pressure-distributing gel overlays on hospital beds.

Improved gel compounds based on reaction products of polyols and polyisocyanates have now been found and are characterized in that the polyol component consists of a mixture of a) one or more polyols having hydroxyl values below 112 and b) one or more polyols having hydroxyl values in the range from 112 to 600 and in that the isocyanate index of the reaction mixture is in the range from 15 to 70.

The gel compounds according to the invention are generally water-free.

The isocyanate index is the equivalent ratio (NCO/OH) ×100. For example, an isocyanate index of 15 means that, for one reactive OH group in the polyols, there are 0.15 reactive NCO groups in the polyisocyanate or, for one reactive NCO group in the polyisocyanate, there are 6.67 reactive OH groups in the polyols. Accordingly, an isocyanate index of 70 means that, for one reactive OH group in the polyols, there are 0.7 reactive NCO groups in the polyisocyanate or, for one reactive NCO group in the polyisocyanate, there are 1.43 reactive NCO groups in the polyols.

Polyols having a hydroxyl value below 112 may also be referred to as relatively high molecular weight polyols while polyols having a hydroxyl value of 112 to 600 may also be referred to as low molecular weight polyols.

The ratio by weight of relatively high molecular weight polyols to low molecular weight polyols may be, for example, between 90:10 and 10:90 and is preferably between 85:15 and 50:50.

In addition, gel compounds according to the invention may optionally contain fillers and/or additives known per se from polyurethane chemistry, for example in total quantities of up to 50% by weight, based on the total weight of the gel compound.

The present invention also relates to a process for the production of gel compounds which is characterized in that a mixture of a) one or more polyisocyanates and b) a polyol component consisting of one or more polyols having hydroxyl values below 112 and one or more polyols having hydroxyl values in the range from 112 to 600 and c) optionally a catalyst for the reaction between isocyanate and hydroxyl groups and d) optionally fillers and/or additives known per se from polyurethane chemistry, the isocyanate index of the mixture being between 15 and 70, is allowed to gel.

The polyols used may contain primary and/or secondary hydroxyl groups. Where mixtures of polyols containing primary and secondary hydroxyl groups are used, it has been found that the primary hydroxyl groups react preferentially with the isocyanate component. In this case, only the primary hydroxyl groups of the polyol component could be taken into consideration for the expression "functionality of the polyol component". However, all the hydroxyl groups of the polyol component have to be used for calculating the isocyanate index in the context of the present invention.

In the production of gel compounds according to the invention, the product of the isocyanate functionality and the functionality of the polyol component should be at least 5.2 and is preferably at least 6.5 and, more preferably, at least 7.5.

In addition to its function as a synthesis component for the polyurethane matrix, the polyol component also acts as a dispersant. The polyols to be used in accordance with the invention are preferably the polyhydroxypolyesters, polyethers, polythioethers, polyacetals, polycarbonates, polyester amides, polyamides or polybutadienes known per se in polyurethane chemistry which are liquid at 10° to 60° C. and which have hyroxyl values in the ranges mentioned above.

The polyhydroxypolyesters may be, for example, reaction products of polyhydric, preferably dihydric and, optionally, trihydric alcohols with polybasic, preferably dibasic, carboxylic acids. Instead of the free polycarboxylic acids, the corresponding polycarboxylic anhydrides or corresponding polycarboxylic acid esters of lower alcohols or mixtures thereof may have been used for the production of the polyester. The polycarboxylic acids may be aliphatic, cycloaliphatic, aromatic and/or heterocyclic and may optionally be substituted, for example by halogen atoms, and/or unsaturated.

The following are examples of such carboxylic acids, anhydrides and esters: succinic acid, adipic acid, suberic acid, azelaic acid, sebacic acid, phthalic acid, isophthalic acid, trimellitic acid, phthalic anhydride, tetrahydrophthalic anhydride, hexahydrophthalic anhydride, tetrachlorophthalic anhydride, endomethylene tetrahydrophthalic anhydride, glutaric anhydride, maleic acid, maleic anhydride, fumaric acid, dimerized and trimerized unsaturated fatty acids (optionally in admixture with monomeric unsaturated fatty acids, for example oleic acid), terephthalic acid dimethyl ester and terephthalic acid bis-glycol ester. Suitable polyhydric alcohols are, for example, ethylene glycol, 1,2- and 1,3-propylene glycol, 1,4-, 1,3- and 2,3-butylene glycol, hexane-1,6-diol, octane-1,8-diol, neopentyl glycol, 1,4-bis-hydroxymethyl cyclohexane, 2-methylpropane-1,3-diol, glycerol, trimethylol propane, hexane-1,2,6-triol, butane-1,2,4-triol, trimethylol ethane, pentaerythritol, quinitol, mannitol, sorbitol, formitol, methyl glycoside, diethylene glycol, triethylene glycol, higher polyethylene glycols, dipropylene glycol, higher polypropylene glycols, dibutylene glycol and higher polybutylene glycols. The polyesters may contain terminal carboxyl groups. Polyesters of lactones, for example ε-caprolactone, or of hydroxycarboxylic acids, for example ω-hydroxycaproic acid, may also be used.

The polyhydroxypolyethers may be, for example, polyethers containing at least two, generally two to eight and preferably three to six hydroxyl groups. Polyhydroxypolyethers such as these are known per se and may be produced, for example, by polymerization of epoxides, such as ethylene oxide, propylene oxide, butylene oxide, tetrahydrofuran, styrene oxide and/or epichlorohydrin on their own, for example in the presence of Lewis catalysts, such as $BF_3$, or by addition of these epoxides, preferably ethylene oxide and/or propylene oxide, in admixture or successively (where two or more epoxides are used), onto starter components containing reactive hydrogen atoms, such as water, alcohols, ammonia or amines, for example ethylene glycol, 1,3-propylene glycol, 1,2-propylene glycol, trimethylol propane, glycerol, sorbitol, 4,4'-dihydroxydiphenyl propane, aniline, ethanolamine or ethylenediamine. Sucrose polyethers, for example of the type described in DE-AS 1 176 385 and in DE-AS 1 064 938, and formitol- or formose- started polyethers (see DE-OS 2 639 083 and DE-OS 2 737 951) may also be used.

Other suitable polyols are OH-functional polybutadienes.

Among the polyhydroxypolythioethers, the condensation products of thiodiglycol on its own and/or with other glycols, dicarboxylic acids, formaldehyde, aminocarboxylic acids and/or aminoalcohols are of particular interest. Depending on the co-components, the products are, for example, polythio mixed ethers, polythioether esters or polythioether ester amides.

Suitable polyhydroxypolyacetals are, for example, the compounds obtainable from glycols, such as diethylene glycol, triethylene glycol, 4,4'-dioxyethoxydiphenyl dimethyl methane and hexanediol with formaldehyde. Polyacetals suitable for the purposes of the invention may also be obtained by polymerization of cyclic acetals, for example trioxane (see DE-OS 1 694 128).

Suitable polyhydroxypolycarbonates are, for example, types known per se which may be obtained, for example, by reaction of diols, such as propane-1,3-diol, butane-1,4-diol, hexane-1,6-diol, diethylene glycol, triethylene glycol, tetraethylene glycol and/or thiodiglycol, with diaryl carbonates, for example diphenyl carbonate, or phosgene (see DE-AS 1 694 080, DE-AS 1 915 908, DE-AS 2 221 751 and DE-OS 2 605 024).

The polyhydroxypolyester amides and polyamides may be, for example, the predominantly linear condensates obtained from polybasic saturated or unsaturated carboxylic acids or anhydrides thereof and polyfunctional saturated or unsaturated aminoalcohols, diamines, polyamines and mixtures thereof.

Polyhydroxyl compounds already containing urethane or urea groups and optionally modified natural polyols, such as castor oil, may also be used as polyol component in the process according to the invention.

In addition, polyhydroxyl compounds containing high molecular weight polyadducts, polycondensates or polymers in finely disperse or dissolved form may optionally be used as the polyol component. Polyhydroxyl compounds such as these may be obtained, for example, by carrying out polyaddition reactions (for example reactions between polyisocyanates and aminofunctional compounds) or polycondensation reactions (for example between formaldehyde and phenols and/or amines) in situ in the. hydroxyfunctional compounds mentioned above. Processes such as these are described, for example, in DE-AS 1 168 075, DE-AS 1 260 142 and in DE-OSS 2 324 134, 2 423 984, 2 512 385, 2 513 815, 2 550 796, 2 550 797, 2 550 833, 2 550 862, 2 633 293 and 2 639 254. It is also possible to use high molecular weight polyhydroxyl compounds containing polyadducts, condensates or polymers which are obtained by mixing an aqueous polymer dispersion with a polyhydroxyl compound and subsequently removing the water from the mixture (see U.S. Pat. No. 3,869,413 and DE-OS 2 550 860).

Polyhydroxyl compounds modified by vinyl polymers, of the type obtainable for example by polymerization of styrene and acrylonitrile in the presence of polyethers (see U.S. Pat. Nos. 3,383,351, 3,304,273, 3,523,093 and 3,110,695 and DE-AS 1 152 536) or polycarbonate polyols (see DE-PS 1 769 795 and U.S. Pat. No. 3,637,909), are also suitable as polyol component for the process according to the invention. Where polyether polyols modified by graft polymerization with vinyl phosphonic acid esters and, optionally, (meth)acrylonitrile, (meth)acrylamide or OH-functional (meth)acrylates in accordance with DE-OSS 2 442 101, 2 644 922 and 2 646 141 are used, gel compounds having particularly pronounced flame resistance are obtained.

Polyol components suitable for use in accordance with the invention are described, for example, in High Polymers, Vol. XVI, "Polyurethanes, Chemistry and Technology", edited by Saunders-Frisch, Interscience Publishers, New York/London, Vol. I, (1962), pages 32–42 and pages 44–54 and Vol. II (1964), pages 5–6 and 198–199 and in Kunststoff-Handbuch, Vol. VII, Vieweg-Höchtlen, Carl-Hanser-Verlag, M chen (1966), for example on pages 45–71. Mixtures of the above-mentioned compounds, for example mixtures of polyethers and polyesters, may of course also be used.

According to the invention, the above-mentioned polyhydroxypolyethers known per se in polyurethane chemistry containing 2 to 8 and preferably 3 to 6 hydroxyl groups per molecule are preferably used as the polyol component. Particularly preferred polyhydroxypolyethers—optionally in admixture with other polyethers—are those which at least terminally contain ethylene oxide units and hence primary hydroxyl groups. The percentage content of ethylene oxide sequences in polyethers to be used in accordance with the invention is preferably at least 15% by weight and, more preferably, at least 20% by weight.

The polyisocyanates used for the production of gel compounds in accordance with the invention are, for example, aliphatic, cycloaliphatic, araliphatic, aromatic and/or heterocyclic polyisocyanates of the type described, for example, by W. Siefken in Justus Liebigs Annalen der Chemie, 562, pages 75 to 136, for example those corresponding to the following formula $$Q(NCO)_n$$

in which n=2 to 4, preferably 2, and

Q is an aliphatic hydrocarbon radical containing 2 to 18 and preferably 6 to 10 carbon atoms, a cycloaliphatic hydrocarbon radical containing 4 to 15 and preferably 5 to 10 carbon atoms, an aromatic hydrocarbon radical containing 6 to 15 and preferably 6 to 13 carbon atoms or an araliphatic hydrocarbon radical containing 8 to 15 and preferably 8 to 13 carbon atoms.

Individual compounds of this type are ethylene diisocyanate, 1,4-tetramethylene diisocyanate, 1,6-hexamethylene 1,12-dodecane diisocyanate, cyclobutane-1,3-diisocyanate, cyclohexane-1,3- and -1,4-diisocyanate and mixtures of these isomers, 1-isocyanato-3,3,5-trimethyl-5-isocyanatomethyl cyclohexane (DE-AS 1 202 785 and U.S. Pat. No. 3,401,190), 2,4- and 2,6-hexahydrotolylene diisocyanate and mixtures of these isomers, hexahydro-1,3- and/or -1,4-phenylene diisocyanate, perhydro-2,4'- and/or -4,4'-diphenyl methane diisocyanate, 1,3- and 1,4-phenylene diisocyanate, 2,4- and 2,6-tolylene diisocyanate and mixtures of these isomers, diphenylmethane-2,4'- and/or -4,4'-diisocyanate and naphthylene-1,5-diisocyanate.

Other suitable polyisocyanates are, for example, triphenylmethane-4,4',4''-triisocyanate, polyphenyl polymethylene polyisocyanates of the type obtained by phosgenation of aniline-formaldehyde condensates and described, for example, in GB-PS 874,430 and in GB-PS 848,671, m- and p-isocyanatophenyl sulfonyl isocyanates (see U.S. Pat. No. 3,277,138), polyisocyanates containing carbodiimide groups (see DE-PS 1 092 007, U.S. Pat. No. 3,152,162 and DE-OSS 2 504 400, 2 537 685 and 2 552 350), norbornane diisocyanates (according to U.S. Pat. No. 3,492,330), polyisocyanates containing allophanate groups (see GB-PS 994,890, BE-PS 761 626 and NL patent application 71 02 524), polyisocyanates containing isocyanurate groups (see U.S. Pat. No. 3,001,973, DE-PSS 1 022 789, 1 222 067 and 1 027 394, DE-OSS 1 929 034 and 2 004 048), polyisocyanates containing urethane groups (see BE-PS 752 261, U.S. Pat. No. 3,394,164 and U.S. Pat. No. 3,644,457), polyisocyanates containing acylated urea groups (see DE-PS 1 230 778), polyisocyanates containing biuret groups (see U.S. Pat. Nos. 3,124,605 and 3,201,372 and GB-PS 889,050), polyisocyanates produced by telomerization reactions (see DE-PS 3 654 106), polyisocyanates containing ester groups (see GB-PSS 965,474 and 1,072,956, U.S. Pat. No. 3,567,763 and DE-PS 1 231 688), reaction products of the above-mentioned isocyanates with acetals (see DE-PS 1 072 385) and polyisocyanates containing polymeric fatty acid esters (see U.S. Pat. No. 3,455,883).

It is also possible to use the distillation residues containing isocyanates groups obtained in the industrial production of isocyanates, optionally dissolved in one or more of the above-mentioned polyisocyanateso. Mixtures of the above-mentioned polyisocyanates may also be used.

Preferred isocyanates are, for example, 2,4- and 2,6-tolylene diisocyanate and mixtures of the isomers, polyphenyl polymethylene polyisocyanates of the type obtainable by phosgenation of aniline-formaldehyde condensates and polyisocyanates containing carbodiimide groups, urethane groups, allophanate groups, isocyanurate groups, urea groups or biuret groups.

Particularly preferred polyisocyanates are biuretized or trimerized 1,6-hexamethylene diisocynate, tripropylene-glycol-modifieddiphenylmethane-4,4'-diisocyanate, mixtures of polyphenyl polymethylene polyisocyanates and diphenylmethane-2,4'- and -4,4'-diisocyanates in which the binuclear component preferably makes up more than 70% by weight and the 2,4'-isomer content is more than 30%.

The content of polyisocyanates in the mixtures to be produced in accordance with the invention for gel compounds is, for example, from 5 to 50% by weight and preferably from 10 to 35% by weight, based on the total weight of the polyol component and the polyisocyanates.

The basically slow gel-forming reaction may optionally be accelerated by addition of catalysts. Suitable catalysts are catalysts known per se which accelerate the reaction between hydroxyl and isocyanate groups, for example tertiary amines, such as triethylamine, tributylamine, N-methyl morpholine, N-ethyl morpholine, N,N,N',N'-tetramethyl ethylenediamine, 1,4-diazabicyclo-(2,2,2)-octane, N-methyl-N'-dimethylaminoethyl piperazine, N,N-dimethyl benzylamine, bis-(N,N-diethylaminoethyl)-adipate, N,N-dimethyl benzylamine, pentamethyl diethylenetriamine, N,N-dimethyl cyclohexylamine, N,N,N',N'-tetramethyl-1,3-butane diamine, N,N-dimethyl-$\beta$-phenyl ethylamine, 1,2-dimethyl imidazole and 2-methyl imidazole. Other suitable catalysts are Mannich bases known per se of secondary amines, such as dimethylamine, and aldehydes, preferably formaldehyde, or ketones, such as acetone, methyl ethyl ketone or cyclohexanone, and phenols, such as phenol, nonylphenol or bisphenols.

Other suitable catalysts are silaamines containing carbon-silicon bonds (see, for example DE-PS 1 229 290 and U.S. Pat. No. 3,620,984), for example 2,2,4-trimethyl-2-silamorpholine and 1,3-diethylaminomethyl tetramethyl disiloxane.

Other suitable catalysts are nitrogen-containing bases, such as tetraalkyl ammonium hydroxides, alkali metal hydroxides, such as sodium hydroxide, alkali metal phenolates, such as sodium phenolate, or alkali metal alcoholates, such as sodium methylate. Hexahydrotriazines may also be used as catalysts.

Organometallic compounds, more particularly organotin compounds, are also suitable catalysts. Preferred organotin compounds are tin(II) salts of carboxylic acids, such as tin(II) acetate, octoate, ethylhexoate, and tin(IV) compounds, for example dibutyl tin(IV) oxide, chloride, acetate, dilaurate, maleate or dioctyl tin acetate.

Other catalysts and information on the way in which they work can be found in Kunststoff-Handbuch, Vol. VII, edited by Vieweg and Höchtlen, Carl-Hanser-Verlag München 1966, for example on pages 96 to 102.

Mixtures of different catalysts may also be used.

The catalysts may be used, for example, in a quantity of 0.1 to 10% by weight, based on the total weight of the mixture used to produce the gel compounds.

The fillers and/or additives known per se from polyurethane chemistry optionally present in the gel compounds according to the invention may be, for example, inorganic and/or organic fillers, coloring agents, water-binding agents, surface-active agents, plant protection agents, extending agents and/or plasticizers.

Inorganic fillers may be, for example, heavy spar, chalk, gypsum, kieserite, soda, titanium dioxide, quartz sand, kaolin, carbon black, glass microbeads and hollow glass microbeads. Organic fillers may be, for example, powders based on polystyrene, polyvinyl chloride, urea-formaldehyde compounds and/or polyhydrazodicarbonamides (obtained, for example, from hydrazine and tolylene diisocyanate). For example, urea-formaldehyde resins or polyhydrazodicarbonamides may have been directly produced in one of the polyols to be used for the production of the gel compounds in accordance with the invention. Hollow microbeads of organic origin may also be added.

Inorganic and/or organic fillers may also be used in the form of chopped strands. Suitable chopped strands are, for example, glass fibers and/or fibers of organic origin, for example polyester or polyamide fibers. The chopped strands may be, for example, from 0.01 to 1 cm long. Inorganic fillers may also be metal powders, for example iron or copper powder.

The gel compounds according to the invention may contain organic and/or inorganic dyes and/or pigments known per se, for example iron oxide and/or chromium oxide pigments and phthalocyanine- and/or monoazo-based pigments, as coloring agents, for example for pigmenting polyurethanes.

Preferred water-binding agents are zeolites. Suitable synthetic zeolites are commercially available, for example under the name Baylith ®.

Suitable surface-active agents are, for example, cellulose powder, active carbon and silica preparations.

The flameproofing agents used may be, for example, sodium polymetaphosphates or amine phosphates, for example melamine phosphates.

Suitable extending agents are, in particular, liquid, substantially inert substances which have a boiling point above 150° C. (under normal pressure), for example alkyl-, alkoxy- and/or halogen-substituted aromatic compounds, such as dodecylbenzene, m-dipropoxybenzene and/or o-dichlorobenzene, halogenatd aliphatic compounds, such as chlorinated paraffins, organic carbonates, such as propylene carbonate, carboxylic acid esters, such as dioctyl phthalate, and also dodecyl sulfonic acid esters and organophosphorus compounds, such as tricresyl phosphate.

Esters of polybasic, preferably dibasic, carboxylic acids with monohydric alcohols are mentioned as examples of plasticizers. The acid component of these esters may be derived, for example, from succinic acid, isophthalic acid, trimellitic acid, phthalic anhydride, tetra- and/or hexahydrophthalic anhydride, endomethylene tetrahydrophthalic anhydride, glutaric anhydride, maleic anhyride, fumaric acid and/or dimeric and/or trimeric fatty acids, such as oleic acid, optionally in admixture with monomeric fatty acids. The alcohol component of the esters may be derived, for example, from branched and/or unbranched aliphatic alcohols containing 1 to 20 carbon atoms, such as methanol, ethanol, propanol, isopropanol, n-butanol, sec. butanol, tert. butanol, the various isomers of pentyl alcohol, hexyl alcohol, octyl alcohol (for example 2-ethyl hexanol), nonyl alcohol, decyl alcohol, lauryl alcohol, myristyl alcohol, cetyl alcohol, stearyl alcohol, and/or from naturally occurring fatty and wax alcohols or from fatty and wax alcohols obtainable by hydrogenation of naturally occurring carboxylic acids. Other suitable alcohol components are cycloaliphatic and/or aromatic hydroxy compounds, for example cyclohexanol and homologs thereof, phenol, cresyl, thymol, carvacrol, benzyl alcohol and/or phenyl ethanol.

Other suitable plasticizers are esters of the above-mentioned alcohols with phosphoric acid. Phosphoric acid esters of halogenated alcohols, such as trichloroethyl phosphate for example, may also be used. In their case, a flameproofing effect may be obtained simultaneously with the plasticizer effect. Mixed esters of the above-mentioned alcohols and carboxylic acids may of course also be used.

The plasticizers may also be so-called polymeric plasticizers, for example polyesters of adipic, sebacic and/or phthalic acid.

Alkyl sulfonic acid esters of phenol, for example paraffin sulfonic acid phenyl ester, may also be used as plasticizers.

The content of fillers and/or additives in the gel compounds according to the invention and during their production may amount, for example, to a total of up to 50% by weight, based on the total weight of the gel compound.

In one particular embodiment of the production of gel compounds in accordance with the invention, air or another gas may be introduced under pressure or stirred into the reaction mixture, for example in a quantity of up to 20% by weight, based on the gel compound. The gel compounds obtained in this way are lighter in weight.

The gel compounds according to the invention may be used, for example, as pressure-distributing elements. To this end, the gel compounds generally have to be provided with a partial, one-sided or all-round coating, covering or envelope.

In applications where the specifically variable adhesiveness of the gel compounds is to be utilized, for example in padding for human or animal body surfaces, the gel compounds need only be coated or covered partially or on one side. This is particularly the case where the gel compounds are used for disposable articles.

In many applications, all-round, i.e. complete, envelopment of the gel compound is necessary for hygienic reasons. To enable the gel compounds fully to develop their pressure-distributing effect, it is of advantage to use elastic, extensible envelope materials for this purpose. Particularly suitable materials of this type are elastic films, for example polymer films which combine good tough and resilient behavior (as measured, for example, in the biaxial penetration test according to DIN 55 373) with high elongation at break and ultimate tensile strength (as measured for example, in accordance with DIN 53 455).

Such films may be, for example the polyurethane films marketed under the names Walopur ® by Wolff-Walsrode and Platilon ® by Plate. Other suitable films may have been produced from thermoplastic polyester elastomers (for example Hytrel ®, a product of Du-Pont) or from styrene- and butadiene-based block copolymers, optionally in admixture with polyolefins. Suitable styrene-based block copolymers are, for example, the products marketed by Shell under the name Cariflex ®. Styrene/ethylene/butylene/stryene block copolymers are also suitable. Block copolymers such as these are marketed, for example, by Shell under the name Kraton ®. Other suitable films are films of ethylene/vinyl acetate polymers, optionally in conjunction with other polymer films, and also thin films or natural or synthetic rubber materials. Films of plasticized polyvinyl chloride may also be used.

These films may be thermoformed, welded or bonded. Accordingly, it is particularly simple to make these films into suitable envelopes for pressure-distributing elements containing gel compounds according to the invention.

In one particular embodiment, envelopes for gel compounds according to the invention may also be obtained by welding or bonding a surface film to thermoformed articles of the above-mentioned films or by bonding or welding to thermoformed half-shells of these films to one another.

Other suitable envelopes are coated, elastic flat textiles, such as woven fabrics, knitted fabrics or nonwovens of natural or synthetic, organic or inorganic fibers of elastic character which show high elongation at break and ultimate tensile strength (according to DIN 53 455). Suitable coatings for these elastic textile materials are, for example, elastic polyurethane coatins of the type marketed, for example, by Bayer AG under the name Impranil ®. Coatings based on plasticized polyvinyl chloride are also possible.

The coated textile materials may be stitched, bonded or welded. Accordingly, it is particularly simple to make suitable envelopes for the gel compounds according to the invention from coated flat textile materials.

The gel compounds according to the invention may also be enveloped by application to the surface of the gel compound of a liquid or dissolved material which solidifies to an elastic material on the surface and can be subjected there to another film-forming process. Particularly suitable coating materials for this purpose are polyurethane-based materials of the type marketed, for example by Bayer AG under the name Impranil ® which may be applied in solution or dispersion to a gel compound according to the invention and, after removal of the solvent or dispersant, form a suitable elastic envelope.

Suitable flexible envelopes may also be obtained by coating the gel compound with a polyurethane-forming two-component lacquer.

The production of gel compounds in accordance with the invention may be carried out in various ways.

For example, they may be produced by the one-shot process or by the prepolymer process. In the one-shot process, all the components, for example polyols, polyisocyanates, catalyst, if any, and optionally fillers and/or additives, may be combined all at once and intensively mixed.

If the prepolymer process is used, it may be carried out in two ways. Either an isocyanate prepolymer is initially prepared by reaction of part of the polyol with the total quantity of polyisocyanate required to form the gel and the rest of the polyol and, optionally, catalyst, fillers and/or additives are then added to and intensively mixed with the prepolymer obtained. It is also possible initially to react the total quantity of polyol required to form the gel with part of the polyisocyanate to form a hydroxyl prepolymer and subsequently to add the rest of the isocyanate and the optional components.

A variant of the one-shot process in combination with the hydroxyl prepolymer process is particularly advantageous. In this variant, the polyol mixture, the catalyst and/or fillers and/or additives, if any, and two different polyisocyanates are combined all at once and intensively mixed. One of the polyisocyanates is aromatic, the other aliphatic. On account of the considerable difference in the reactivity of these two polyisocyanates, a hydroxyl prepolymer is initially formed from the polyol as a whole and the more reactive polyisocyanate and subsequently reacts with the less reactive polyisocyanate, generally within a few minutes, to form the gel. Particularly tough gel compounds are obtained in this way.

In all these processes, individual components or mixtures of components may be transported, metered and mixed by the units known per se in polyurethane chemistry.

Pressure-distributing elements containing the gel compounds according to the invention may be produced in various ways. For example, the gel compounds may initially be produced in a mold and the gel compound, which is pressure-resistant after fully reacting, may be covered with a flexible film or flexible material or lacquered or coated. In a particularly preferred and very simple procedure, the components required to produce the gel compound may be mixed in a mechanical mixer and the resulting mixture may be directly poured into an envelope of an elastic, flexible film or an elastic, coated flat textile material.

After addition of the mixture, the envelope may be tightly closed and the gel-forming reaction left to take place therein. The envelope may be placed between two planoparallel plates or introduced into another mold during formation of the gel. In this case, the pressure-distributing element formed has substantially parallel upper and lower surfaces or a shape corresponding to the inside of the mold used. Depending on the type of reaction components used, the catalysts added and the temperature profile, the time taken to complete gel formation may be, for example, between 1 minute and 12 hours. The temperature of the components used is preferably in the range from 10° to 60° C.

This particularly preferred procedure enables pressure-distributing elements of any shape and size to be produced simply by forming the envelopes in the corresponding mold by generally known methods and filling them with the compound formed. Particularly shapes and sizes are square and rectangular cushions having an edge ledge length of, for example, 20 to 60 cm.

The thickness of the pressure-distributing elements may also be varied within wide limits. Where the pressure-distributing elements are used as seat cushions, generally square in shape with an edge length of 35 to 45 cm, the best results are obtained with thicknesses of more than 2 cm. Where the pressure-distributing elements are used as mattresses, mattress inlays or mattress overlays, smaller thicknesses may be of advantage.

In applications where a self-adhesive gel compound according to the invention is placed directly on the body surface of human beings or animals, thicknesses of the gel layers of 1 mm to 2 cm are generally of advantage.

The gel compounds according to the invention have the property of deforming under pressure and, in doing so, distributing the pressure, i.e. flattening pressure peaks, and returning to their original state after removal of the deforming force. The effect of this property is that pressure-distributing elements containing gel compounds according to the invention are capable of deforming under the pressure of a person lying or sitting on them to such an extent that any pressure sores are avoided or existing sores heal more quickly.

Pressure-distributing elements containing gel compounds according to the invention may be used in various ways, for example as gel cushions in orthopedic shoes and sports shoes, on motorcycle saddles, under riding saddles, on wheelchairs and hospital beds, on seat cushions, back cusions, headrests and armrests of chairs, car seats and other seats, on operating tables or medical examination tables or in incubators.

In addition, pressure-distributing elements which consist of a gel compound according to the invention covered or coated on one side and which show high adhesive strength may be used, in particular, on body surfaces of human beings and animals, for example as pads on elbows, shin bones or feet for avoiding and reducing the effects of injuries, particularly in sport; as pads for cosmetic masks, for example face masks, as self-adhesive coverings for eye or ear bandages for fastening purposes; as padding for supporting sagging breast tissue; as padding under riding saddles, on prostheses or on sanitary napkins for preventing pressure points.

The present invention provides gel compounds which can be made by machine more easily than before and which show higher structural strength than hitherto known gel compounds.

The invention is illustrated by the following Examples.

EXAMPLES

General

The following polyisocyanates, polyols and catalysts were used in the Examples:

Polyisocyanate 1

4,4'-Diisocyanatodiphenyl methane liquefied by prepolymerization with tripropylene glycol: average NCO functionality 2.05, NCO content 23% by weight.

Polyisocyanate 2

Commercially available biuretized 1,6-hexamethylene diisocyanate: average NCO functionality 3.6, NCO content 21% by weight, average molecular weight (number average) 700.

Polyisocyanate 3

Technical polyisocyanate isomer mixture obtained by phosgenation of aniline/formaldehyde condensates (binuclear content 90% by weight, content of 2,4-isomers 45% by weight) and modified with a mixture of lower propylene glycols: NCO content 24.5% by weight.

Polyols 1 to 4

These polyols are polyether polyols obtained by addition of ethylene oxide and propylene oxide onto a starter molecule. The are listed in the following Table. TMP stands for trimethylol propane.

| Polyol No. | Propylene oxide % by weight | Ethylene oxide % by weight | Starter molecule | OH value | OH functionality |
| --- | --- | --- | --- | --- | --- |
| 1 | 3 | 97 | TMP | 250 | 3 |
| 2 | 18 | 82 | Sorbitol | 100 | 6 |
| 3 | 45 | 55 | TMP | 56 | 3 |
| 4 | 83 | 17 | TMP | 35 | 3 |

Polyol 5

Polyester of adipic acid, butane-1,3-diol and butane-1,4-diol: hydroxyl value 54.

Catalyst 1

1,4-diazabicyclo-(2,2,2)-octane in the form of a 33% by weight dispersion in dipropylene glycol.

Catalyst 2

Di-n-butyl tin(IV) dilaurate.

In the following, parts are parts by weight.

EXAMPLE 1

420 Parts polyisocyanate 3 were added to and homogeneously mixed with a mixture of 600 parts polyol 1, 1,050 parts polyol 3 and 1,350 parts polyol 4. 10 Parts of catalyst 1 were added to the resulting mixture and thoroughly dispersed therein by intensive stirring for 30 seconds. The reaction mixture obtained was immediately poured into a 40×40 cm envelope of 0.2 mm thick polyurethane film. The film envelope was hermetically sealed and immediately placed on a support. Solidification of the reaction mixture to the gel began 4 minutes after addition of the catalyst and was largely over after another 15 minutes. The gel cushion obtained was 2 cm thick. As a pressure-distributing overlay on foam seats, it prevents pressure sores in injured people who have to sit for long periods.

EXAMPLE 2

A mixture of 60 parts polyol 1, 105 parts polyol 3 and 135 parts polyol 4 was homogeneously mixed with 46.8 parts polyisocyanate 3. 3 Parts catalyst 1 were homogeneously dispersed in the resulting mixture over a period of 30 seconds. The reaction mixture obtained was immediately poured into a thermoformed shell which consisted of 0.15 mm thick polyurethane film and which was arranged in a supporting mold.

Solidification of the mixture to the gel began 1 minute after addition of the catalyst and was largely over after another minute. A polyurethane film was placed on the surface of the gel and was welded all round to the edge of the thermoformed film shell. A gel pad measuring 1.5×10×20 cm was obtained. A gel pad such as this is suitable for cushioning elbows and ankles of bedridden patients.

EXAMPLE 3

A mixture of 200 parts polyol 1, 50 parts polyol 2 and 50 parts polyol 3 was homogeneously mixed with 87.5 parts polyisocyanate 3. 2.5 Parts catalyst 1 were dispersed in this mixture over a period of 30 seconds. The reaction mixture obtained was immediately poured into an open mold (base area 10×10 cm, height 4 cm). Solidification of the mixture to the gel began 60 seconds after addition of the catalyst and was largely over after another 30 seconds. The gel obtained is suitable in the form of small gel pads for cushioning sports shoes.

EXAMPLE 4

A mixture of 200 parts polyol 1, 50 parts polyol 2 and 50 parts polyol 5 was homogeneously mixed with 105 parts polyisocyanate 3. 2.5 parts catalyst 1 were dispersed in this mixture over a period of 30 seconds. The reaction mixture obtained was poured immediately into a thermoformed shell which consisted of 0.15 mm thick polyurethane film and which was arranged in a supporting mold. Solidification of the mixture to the gel began 60 seconds after addition of the catalyst and was largely over after another 30 seconds. The gel obtained is suitable for filling an envelope of polyurethane film (for example 200 μm thick) to form a gel overlay measuring 60×60×1.5 cm which may be used as an overlay on hospital beds and operating tables for avoiding pressure sores.

EXAMPLE 5

A mixture of 60 parts polyol 1, 105 parts polyol 3 and 135 parts polyol 4 was homogeneously mixed with 48 parts polyisocyanate 1. 1 Part catalyst 2 was dispersed in this mixture over a period of 30 seconds. The reaction mixture obtained was immediately poured into a thermoformed shell which consisted of 0.15 mm thick polyurethane film and which was arranged in a supporting mold. Solidification of the mixture to the gel began 40 seconds after addition of the catalyst and was largely over after another 30 seconds. A gel obtained in this way can be used in the same way as the gel of Example 4.

EXAMPLE 6

A mixture of 20 parts polyol 1 and 80 parts polyol 3 was homogeneously mixed with 10.5 parts polyisocyanate 2. The cloudy emulsion obtained was left standing for 5 days. It proved to be stable in storage. Thereafter, 2 parts catalyst 2 were homogeneously dispersed in the emulsion over a period of 1 minute. An open mold measuring 15×15 cm for a height of 2 mm was filled to the brim with the reaction mixture obtained. The mold was lined with a 1 mm thick film of polytetrafluoroethylene and had been preheated to 80° C. in a drying cabinet. After 5 minutes (counting from the addition of catalyst), an 18×18 cm piece of an elastic woven fabric of polyamide and polyurethane fibers (80:20) was placed centrally on the reaction mixture. Solidification of the gel occurred after another 2 minutes. After a curing time of 15 minutes at 80° C. and cooling to room temperature, a self-adhesive pad was obtained and may be used to protect shins and elbows against sports injuries.

EXAMPLE 7 a) 160 Parts polyol 1, 40 parts polyol 3 and 64 parts polyisocyanate 3 were homogeneously mixed. 1 Part catalyst 1 was then added and dispersed over a period of 20 seconds. Solidification of the mixture to the gel began 1 minute after addition of the catalyst and was largely over after another 3 minutes. A soft elastic gel compound was obtained. It consistency was determined by the method described below. A penetrometer value of 77 was determined.

Similar reaction mixtures were prepared and allowed to solidify, the difference being that polyisocyanate 3 was used in a smaller quantity.

b) Where 63.1 parts polyisocyanate 3 were used, a soft and elastic gel having a penetrometer value of 98 was obtained.

This means that, in a batch according to the invention of 265 parts reaction mixture, a deficiency of −0.9 part polyisocyanate does not result in any particularly pronounced change in the consistency of the product obtained.

c) Where 60.8 parts polyisocyanate 3 were used, a highly viscous mass with a penetrometer value of 210 was obtained. This means that, in a batch according to the invention of 265 parts reaction mixture, only a deficiency of −3.2 parts polyisocyanate produces a very pronounced change in the consistency of the product obtained.

Determination of Gel Consistency

The consistency of the gel compounds was determined with a DIN and ASTM penetrometer. It was tested under the following conditions:

| | |
|---|---|
| penetration element: | 25 mm diameter hemisphere |
| penetration weight: | 100 g |
| penetration time: | 10 seconds |
| temperature of the gel compounds: | 25° C. |

The particular depth of penetration was read off in 1/10 mm units from an indicator and represents the particular penetrometer value.

EXAMPLE 8 (Comparison Example)

a) A comparison gel compound (produced without a polyol having a hydroxyl value greater than 112), which had a similar penetration value to the gel of Example 7a), was obtained as follows:

200 Parts polyol 3 and 18 parts polyisocyanate 3 were homogeneously mixed. 4 Parts catalyst 1 were then added and dispersed over a period of 30 seconds. Solidification of the mixture to the gel began 1 minute after addition of the catalyst and was largely over after 12 seconds. The soft and elastic gel compound obtained had a penetrometer value of 79, as determined by the method described in Example 7.

b) The corresponding preparation and gelation of a reaction mixture containing only 17.1 parts as opposed to 18 parts of polyisocyanate 3 produced a highly viscous mass which had a penetrometer value of 225.

This means that, in a comparison batch of 222 parts reaction mixture, a deficiency of −0.9 parts polyisocyanate leads to a very pronounced change in the consistency of the product obtained.

What is claimed is:

1. An improved gel compound based on a reaction product of polyols and polyisocyanates, in which the polyol component consists essentially of a mixture of
    a) one or more polyols having hydroxyl values below 112 and
    b) one or more polyols having hydroxyl values of 112 to 600 and in which the isocyanate index of the reaction mixture is in the range from 15 to 60 and wherein the reaction is carried out in the presence of an amine or organo tin catalyst.

2. A gel compound of claim 1, in which the ratio by weight of component a) to component b) is between 90:10 and 10:90.

3. A gel compound of claim 1, which additionally contains fillers and/or additives known from polyurethane chemistry in a total quantity of up to 50% by weight, based on the total weight of the gel compound.

4. A process for the production of a gel comprising:
    (a) mixing:
        (i) one or more polyisocyanates,
        (ii) one or more polyols having hydroxyl values below 112,
        (iii) one or more polyols having hydroxyl values in the range of from 112 to 600, and
        (iv) a catalyst, to form a mixture having an isocyanate index of between 15 and 60, and for which the product of the isocyanate functionality and the functionality of the polyol component is at least 5.2, which mixture reacts to form a gel, and (b) allowing the mixture to react and form a gel.

5. The process of claim 4, in which the mixture additionally contains auxiliaries and/or additives known per se from polyurethane chemistry.

6. The process of claim 4, in which polyhydroxypolyethers containing 2 to 8 hydroxyl groups per molecule are used as the polyol component.

7. The process of claim 4, in which the isocyanates used correspond to the formula $$Q(NCO)_n$$

in which
n=2 to 4 and
Q is an aliphatic hydrocarbon radical containing 8 to 18 carbon atoms, a cycloaliphatic hydrocarbon radical containing 4 to 15 carbon atoms, an aromatic hydrocarbon radical containing 6 to 15 carbon atoms or an araliphatic hydrocarbon radical containing 8 to 15 carbon atoms.

8. The process of claim 4, in which a catalyst is used in a quantity of 0.1 to 10% by weight, based on the total weight of the mixture used to produce the gel compound, the catalyst being selected from the group consisting of tertiary amines, silamines, nitrogen-containing bases, alkali metal hydroxides, alkali metal phenolates, hexahydrotriazines and organotin compounds.

9. The process of claim 4, in which fillers and/or additives selected from the group consisting of inorganic and organic fillers, coloring agents, water-binding agents, surface-active agents, plant protection agents, extenders and plasticizers are used in a quantity of up to 50% by weight, based on the total weight of the gel compound.

10. Pressure-distributing elements which contain the gel compound of claim 1.

11. Pressure-distributing elements which contain a gel compound prepared according to claim 4.

* * * * *